United States Patent
Yin et al.

(10) Patent No.: US 12,437,084 B2
(45) Date of Patent: Oct. 7, 2025

(54) SYSTEM AND METHOD OF HIDING SECURITY SENSITIVE FEATURES IN UNTRUSTED ENVIRONMENTS

(71) Applicant: Dell Products L.P., Round Rock, TX (US)

(72) Inventors: Juelong Yin, Shanghai (CN); Hao Wang, Shanghai (CN); Dmitry Vladimirovich Krivenok, Dublin (IE); Chaowen Han, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 18/075,503

(22) Filed: Dec. 6, 2022

(65) Prior Publication Data
US 2024/0184897 A1    Jun. 6, 2024

(51) Int. Cl.
*G06F 21/60* (2013.01)
*G06F 21/54* (2013.01)
*G06F 21/57* (2013.01)

(52) U.S. Cl.
CPC .......... *G06F 21/602* (2013.01); *G06F 21/54* (2013.01); *G06F 21/57* (2013.01)

(58) Field of Classification Search
CPC ......... G06F 21/602; G06F 21/54; G06F 21/57
See application file for complete search history.

(56) References Cited

U.S. PATENT DOCUMENTS

| | | | |
|---|---|---|---|
| 9,536,095 B1* | 1/2017 | Buendgen | G06F 9/4406 |
| 10,262,155 B1 | 4/2019 | Sun et al. | |
| 11,099,837 B2 | 8/2021 | Bell, IV et al. | |
| 11,340,928 B2 | 5/2022 | Kulkarni et al. | |
| 11,379,209 B2 | 7/2022 | Liu et al. | |
| 11,455,405 B2 | 9/2022 | Wolfson et al. | |
| 11,461,084 B2* | 10/2022 | Wolfson | H04L 9/0825 |
| 2015/0213273 A1* | 7/2015 | Yasukawa | G06F 21/6218 713/193 |
| 2021/0157623 A1* | 5/2021 | Chandrashekar | G06F 9/5027 |
| 2021/0279326 A1* | 9/2021 | Adam | H04L 9/30 |
| 2022/0147334 A1* | 5/2022 | Gunning | G06F 8/65 |
| 2024/0214358 A1* | 6/2024 | Einarsson | H04N 21/23476 |

* cited by examiner

*Primary Examiner* — Morshed Mehedi
*Assistant Examiner* — Jacob Benedict Knackstedt
(74) *Attorney, Agent, or Firm* — BainwoodHuang

(57) ABSTRACT

Techniques for hiding security-sensitive features in untrusted environments. The techniques include inserting, in a development build image, one or more security-sensitive scripts encrypted with a unique encryption key for the development build image, and inserting, in a release build image, the security-sensitive scripts encrypted with a different unique encryption key for the release build image. The techniques further include saving the unique encryption key for the development build image in an artifact repository, and securely deleting the different unique encryption key for the release build image. In this way, user access to certain software code or scripts, device files, and/or other security-sensitive features can be restricted in a manner that is more user friendly to software development and/or information technology (or "DevOps") engineers.

17 Claims, 5 Drawing Sheets

SYSTEM AND METHOD OF HIDING SECURITY SENSITIVE FEATURES IN UNTRUSTED ENVIRONMENTS

BACKGROUND

Storage systems include storage processing circuitry and arrays of storage devices such as solid-state drives (SSDs), hard disk drives (HDDs), and optical drives. The storage processing circuitry service storage input/output (IO) requests generated by client (or "host") computers communicably coupled to the storage systems. The storage IO requests (e.g., read requests, write requests) specify data blocks, data files, data pages, or other data objects to be read from or written to volumes (VOLs), logical units (LUNs), filesystems, or other storage objects maintained on the storage devices. The storage systems typically have internal features that can be enabled to provide software development and/or information technology (or "DevOps") engineers with enhanced or full control over the systems, such as by providing root access. To protect system integrity, the storage systems typically provide customers (or "users") with limited user privileges that restrict access to certain software code or scripts, device files, and/or other security-sensitive features, preventing any form of root access to the systems.

SUMMARY

Various techniques have been employed to restrict user access to security-sensitive features in storage systems. A first technique includes using undocumented or hidden arguments and/or internal commands to toggle access to the security-sensitive features. However, although this first technique can be easily implemented, it can be easily leaked to an attacker. A second technique includes providing DevOps engineers with a development software build image (or "development build image") that has the security-sensitive features enabled, and providing users with a release software build image (or "release build image") that has the security-sensitive features disabled. However, this second technique can result in the DevOps engineers performing tests on software that is substantially different from software ultimately released to the users, possibly preventing some software problems from being detected until after the release build image is running. A third technique includes using privilege-injected processes to obtain root access to the storage systems and toggling the security-sensitive features with internal commands once root access has been obtained. However, this third technique can require the DevOps engineers to develop a privilege-injected process that is complex and difficult to implement and/or automate.

Techniques are disclosed herein for hiding security-sensitive features in untrusted environments. The disclosed techniques can restrict user access to certain software code or scripts, device files, and/or other security-sensitive features, while being more user friendly to DevOps engineers. A first disclosed technique can include, in a development build image process, generating security-sensitive scripts, generating a unique encryption key for a development build image, and generating other software components or services for the development build image. The first disclosed technique can further include, in the development build image process, encrypting the security-sensitive scripts with the unique encryption key for the development build image, inserting the encrypted security-sensitive scripts and the other unencrypted software components or services in the development build image, and saving and storing the development build image and the unique encryption key for the development build image as artifacts in an artifact repository.

A second disclosed technique can include, in a release build image process, generating security-sensitive scripts, generating a unique encryption key for a release build image, and generating other software components or services for the release build image. The unique encryption key for the release build image is different from the unique encryption key for the development build image. The second disclosed technique can further include, in the release build image process, encrypting the security-sensitive scripts with the unique encryption key for the release build image, inserting the encrypted security-sensitive scripts and the other unencrypted software components or services in the release build image, saving and storing the release build image as an artifact in an artifact repository, and securely deleting the unique encryption key for the release build image.

A third disclosed technique can include deploying the development build image for execution on a storage system in a development environment, and passing or sending the unique encryption key for the development build image to the storage system. The second disclosed technique can further include detecting the unique encryption key for the development build image, decrypting the encrypted security-sensitive scripts with the unique encryption key for the development build image, and determining whether or not decryption of the encrypted security-sensitive scripts was successful. The third disclosed technique can further include, in response to determining that the decryption of the encrypted security-sensitive scripts was successful, executing the security-sensitive scripts, and, in response to determining that the decryption of the encrypted security-sensitive scripts was not successful, avoiding executing the security-sensitive scripts.

By inserting, in a development build image, one or more security-sensitive scripts encrypted with a unique encryption key for the development build image, inserting, in a release build image, the security-sensitive scripts encrypted with a different unique encryption key for the release build image, saving and storing the unique encryption key for the development build image as an artifact in an artifact repository, and securely deleting the different unique encryption key for the release build image, security can be maintained for security-sensitive scripts in a manner that is more user friendly to DevOps engineers.

In certain embodiments, a method includes inserting, in a development build image, a security-sensitive script encrypted with a first unique encryption key for the development build image, and inserting, in a release build image, the security-sensitive script encrypted with a second unique encryption key for the release build image. The second unique encryption key is different from the first unique encryption key. The method further includes saving and storing the first unique encryption key for the development build image, and securely and permanently deleting the second unique encryption key for the release build image.

In certain arrangements, the method includes encrypting the security-sensitive script with the first unique encryption key for the development build image.

In certain arrangements, the method includes encrypting the security-sensitive script using a symmetric encryption technique or an asymmetric encryption technique.

In certain arrangements, the method includes encrypting the security-sensitive script with the second unique encryption key for the release build image.

In certain arrangements, the method includes encrypting the security-sensitive script using an in-memory encryption technique.

In certain arrangements, the method includes deploying the development build image for execution on a storage system.

In certain arrangements, the method includes sending, in a deployment package, the first unique encryption key for the development build image to the storage system. The first unique encryption key is detected by the storage system in the deployment package. The security-sensitive script is decrypted by the storage system with the first unique encryption key, and, in response to decryption of the security-sensitive script being successful, the security-sensitive script is executed by the storage system.

In certain embodiments, a system includes a memory and processing circuitry configured to execute program instructions out of the memory to insert, in a development build image, a security-sensitive script encrypted with a first unique encryption key for the development build image, and to insert, in a release build image, the security-sensitive script encrypted with a second unique encryption key for the release build image. The second unique encryption key is different from the first unique encryption key. The processing circuitry is further configured to execute the program instructions out of the memory to save and store the first unique encryption key for the development build image, and to securely and permanently delete the second unique encryption key for the release build image.

In certain arrangements, the processing circuitry is further configured to execute the program instructions out of the memory to encrypt the security-sensitive script with the first unique encryption key for the development build image.

In certain arrangements, the processing circuitry is further configured to execute the program instructions out of the memory to encrypt the security-sensitive script using a symmetric encryption technique or an asymmetric encryption technique.

In certain arrangements, the processing circuitry is further configured to execute the program instructions out of the memory to encrypt the security-sensitive script with the second unique encryption key for the release build image.

In certain arrangements, the processing circuitry is further configured to execute the program instructions out of the memory to encrypt the security-sensitive script using an in-memory encryption technique.

In certain arrangements, the processing circuitry is further configured to execute the program instructions out of the memory to deploy the development build image for execution on a storage system.

In certain arrangements, the processing circuitry is further configured to execute the program instructions out of the memory to send, in a deployment package, the first unique encryption key for the development build image to the storage system. The first unique encryption key is detected by the storage system in the deployment package. The security-sensitive script is decrypted by the storage system with the first unique encryption key. In response to decryption of the security-sensitive script being successful, the security-sensitive script is executed by the storage system.

In certain embodiments, a computer program product includes a set of non-transitory, computer-readable media having instructions that, when executed by processing circuitry, cause the processing circuitry to perform a method including inserting, in a development build image, a security-sensitive script encrypted with a first unique encryption key for the development build image, and inserting, in a release build image, the security-sensitive script encrypted with a second unique encryption key for the release build image. The second unique encryption key is different from the first unique encryption key. The method further includes saving and storing the first unique encryption key for the development build image, and securely and permanently deleting the second unique encryption key for the release build image.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for hiding security-sensitive features in untrusted environments. The disclosed techniques can include inserting, in a development build image, one or more security-sensitive scripts encrypted with a unique encryption key for the development build image, and inserting, in a release build image, the security-sensitive scripts encrypted with a different unique encryption key for the release build image. The disclosed techniques can further include saving and storing the unique encryption key for the development build image as an artifact in an artifact repository, and securely deleting the different unique encryption key for the release build image. In this way, user access to certain software code or scripts, device files, and/or other security-sensitive features can be restricted in a manner that is more user friendly to software development and/or information technology (or "DevOps") engineers.

Figure 1:
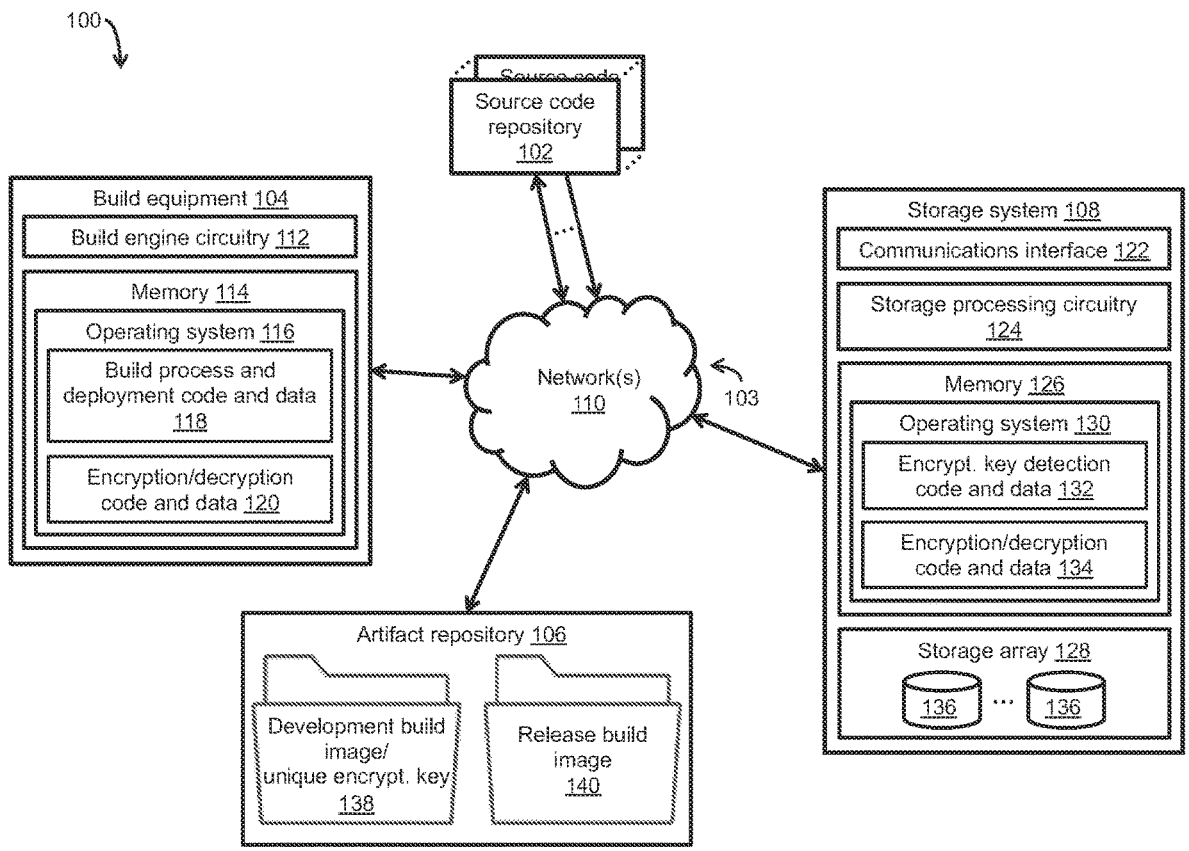
FIG. 1 is a block diagram of an exemplary storage environment, in which techniques can be practiced for hiding security-sensitive features in untrusted environments.

FIG. 1 depicts an illustrative embodiment of an exemplary storage environment 100 for hiding security-sensitive features in untrusted environments. As shown in FIG. 1, the storage environment 100 can include one or more source code repositories 102, build equipment 104, an artifact repository 106, and a storage system 108, each of which is communicably coupled to a communications medium 103 that includes at least one network 110. In this embodiment, each source code repository 102 can be configured to provide a platform for storing and managing source code (e.g., storage applications, programs and/or scripts, components of storage applications, programs and/or scripts) for the storage system 108. The build equipment 104 can be configured to build software applications, programs, and/or scripts from the source code stored in the source code repositories 102. The term "build" is employed herein to refer to putting individual coded components of an application, program, or script together. Such a build can correspond to a pre-release (e.g., development or test) version of an application, program, or script, or a release version of the application, program, or script. One or more such builds can make up a build process, which can include repeatedly collecting the individual coded components of an application, program, or script and compiling them for development or test purposes or release as a final product. The artifact repository 106 can be configured to securely store and provide versioning and dependency management of software artifacts (e.g., build images, unique encryption keys) generated during one or more build processes. For example, the artifact repository 106 may provide such versioning, security, and dependency management of software artifacts in a continuous integration/continuous delivery (CI/CD) process.

The storage system 108 can be configured as a standalone storage system including a single storage appliance, a clustered storage system including two or more storage appliances, a cloud-based storage system, or any other suitable storage system. As shown in FIG. 1, the storage system 108 can include a communications interface 122, storage processing circuitry 124, a memory 126, and a storage array 128. The communications interface 122 can include an Ethernet interface, an InfiniBand interface, a Fiber Channel interface, or any other suitable communications interface. The communications interface 122 can further include small computer system interface (SCSI) target adapters, network interface adapters, or any other suitable adapters for converting electronic, optical, or wireless signals received over the network(s) 110 to a form suitable for use by the storage processing circuitry 124. The storage processing circuitry 124 can be configured to process storage input/output (IO) requests (e.g., SCSI commands, network file system (NFS) commands) issued by client (or "host") computers and store host data in a redundant array of independent disk (RAID) environment implemented on the storage array 128.

The storage array 128 can include storage drives 136 such as solid-state drives (SSDs), hard disk drives (HDDs), flash drives, hybrid drives, or any other suitable storage drives. The storage drives 128 can be configured to store volumes (VOLs), logical units (LUNs), virtual volumes (VVOLs), filesystems, or any other suitable storage objects for hosting data storage of host and device applications within the storage environment 100. The memory 126 of the storage system 108 can include persistent memory (e.g., flash memory, magnetic memory) and non-persistent cache memory (e.g., dynamic random-access memory (DRAM), static random-access memory (SRAM)). The memory 126 can further include an operating system (OS) 130 such as a Linux OS, Unix OS, Windows OS, or any other suitable operating system. The memory 126 can be configured to store a variety of software constructs realized in the form of specialized code and data including encryption key detection code and data 132 and encryption/decryption code and data 134. Such specialized code and data stored in the memory 126 can be accessed and/or executed by the storage processing circuitry 124 to carry out the techniques and/or methods described herein.

The build equipment 104 can include build engine circuitry 112 and a memory 114. The build engine circuitry 112 can be configured to build or process a development software build image (or "development build image") in a development build image process, as well as to build or process a release software build image (or "release build image") in a release build image process. The memory 114 can include persistent memory (e.g., flash memory, magnetic memory), non-persistent cache memory (e.g., dynamic random-access memory (DRAM), static random-access memory (SRAM)), and an operating system (OS) 116 (e.g., Linux OS, Unix OS, Windows OS). The memory 114 can be configured to store a variety of software constructs realized in the form of specialized code and data including build process and deployment code and data 118 and encryption/decryption code and data 120. Such specialized code and data stored in the memory 114 can be accessed and/or executed by the build engine circuitry 112 to further carry out the techniques and/or methods described herein.

In the context of the build engine circuitry 112 and the storage processing circuitry 124 being configured to execute specialized code (e.g., program instructions) out of the memory 114 and the memory 126, respectively, computer program products can be configured to deliver all or portions of the program instructions for execution. Such computer program products can include non-transient computer-readable storage media such as magnetic disks, magnetic tapes, compact disks (CDs), digital versatile disks (DVDs), optical disks, flash drives, solid-state drives (SSDs), secure digital (SD) chips or devices, application specific integrated circuits (ASICs), field programmable gate arrays (FPGAs), and so on. The non-transient computer-readable storage media can be encoded with sets of program instructions for performing the techniques and/or methods described herein.

The communications medium 103 can be configured to interconnect the source code repositories 102, the build equipment 104, the artifact repository 106, and/or the storage system 108 to enable them to communicate and exchange data and control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

During operation, the disclosed techniques can restrict user access to certain software code or scripts, device files, and/or other security-sensitive features, while being more user friendly to DevOps engineers. To that end, the build engine circuitry 112 can execute the encryption/decryption code 120 to encrypt one or more security-sensitive scripts with a unique encryption key for a development build image, and insert the encrypted security-sensitive scripts in the development build image. The build engine circuitry 112 can further execute the encryption/decryption code 120 to encrypt the security-sensitive scripts with a unique encryption key for a release build image, and insert the encrypted security-sensitive scripts in the release build image. In the disclosed techniques, a unique encryption key is generated for each software build image. The unique encryption key for the release build image is therefore different from the unique encryption key for the development build image. Once the security-sensitive scripts have been encrypted with the unique encryption key for the development build image, the build equipment 104 can save and store the development build image and the unique encryption key for the development build image as artifacts in the artifact repository 106. Once the security-sensitive scripts have been encrypted with the different unique encryption key for the release build image, the build equipment 104 can save and store the release build image as an artifact in the artifact repository 106, and securely delete the unique encryption key for the release build image, thereby restricting user access to the security-sensitive scripts in the release build image.

The disclosed techniques for hiding security-sensitive features in untrusted environments will be further understood with reference to the following illustrative example and FIGS. 1-4. In this example, it is assumed that a development environment and a release environment can each be implemented as a virtual environment. It is further assumed that software build images can be packaged for deployment in the virtual environments according to the VMware® Open Virtualization Application/Appliance (OVA) specification, the VMware® Open Virtualization Format (OVF) specification, or any other suitable format or specification. Further in this example, DevOps engineers can employ the build equipment 104 (see FIG. 1) to generate and test a development software build image (the "development build image") using security-sensitive scripts. For example, the security-sensitive scripts may be included in the development build image and executed to enable remote access via the secure shell (SSH) protocol to a Docker® container containing a set of restricted commands, root access via the SSH protocol, and/or any other suitable secure or restricted access for providing enhanced or full control over the storage system 108. Once the development build image has been fully developed and tested, the DevOps engineers can further employ the build equipment 104 to generate a release software build image (the "release build image") that includes the security-sensitive scripts, but is configured to restrict user access to the security-sensitive scripts.

Figure 2:
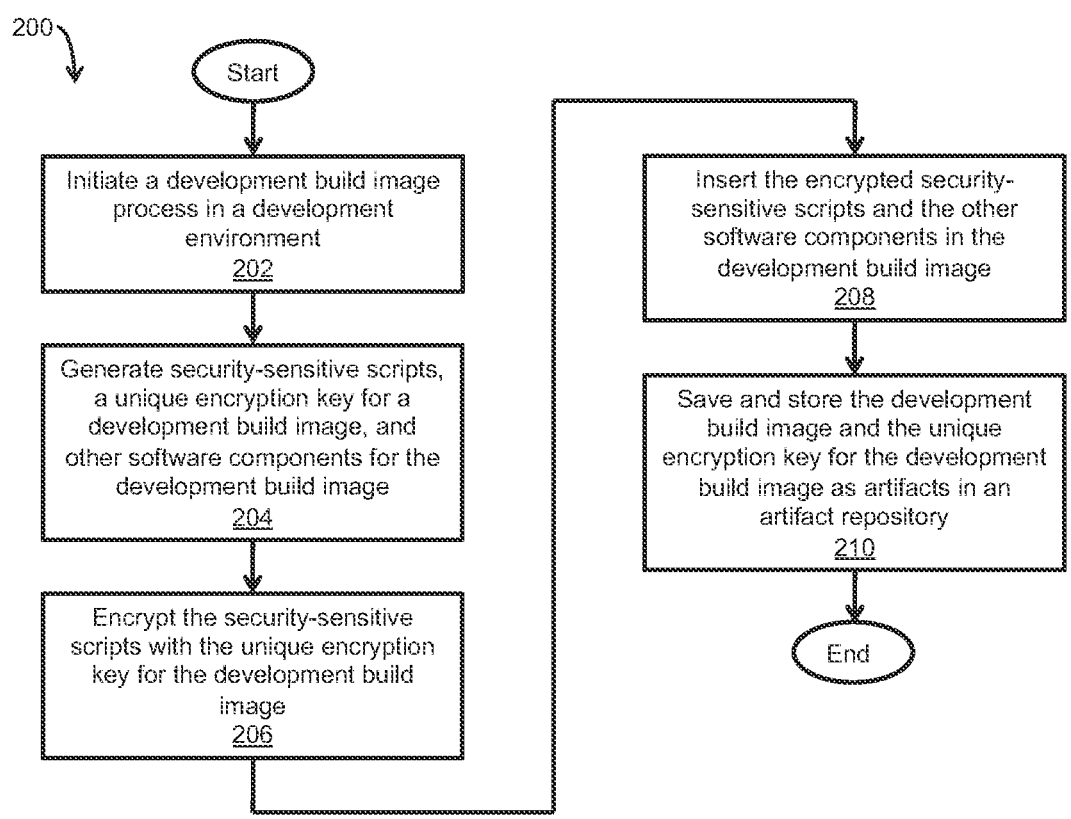
FIG. 2 is a flow diagram for use in describing an illustrative example, which includes hiding security-sensitive features in a development build image process.

This example involves both a development build image process 200 (see FIG. 2) for generating the development build image in the development environment, and a release build image process 300 (see FIG. 3) for generating the release build image in the release environment. As shown in FIG. 2, the DevOps engineers employ the build equipment 104 to initiate the development build image process 200 (block 202; see FIG. 2), which includes executing the build process and deployment code 118 to generate the security-sensitive scripts, to generate a unique encryption key for the development build image, and to generate other software components or services for the development build image (block 204; see FIG. 2). Once the unique encryption key for the development build image has been generated, the build equipment 104 executes the encryption/decryption code 120 to encrypt the security-sensitive scripts with the unique encryption key for the development build image (block 206; see FIG. 2). For example, the security-sensitive scripts for the development build image may be encoded in the Base64 format to generate Base64 binary data or any other suitable binary data. Further, the Base64 binary data may be encrypted using a symmetric encryption technique or any other suitable encryption technique. With symmetric encryption, a single key value (e.g., the unique encryption key value for the development build image) can be used both to encrypt the data and to decrypt the data. The build equipment 104 completes the development build image process 200 by inserting the encrypted security-sensitive scripts and the other unencrypted software components or services in the development build image (block 208; see FIG. 2), and saving and storing the development build image and the unique encryption key for the development build image as artifacts in a volume or folder 138 (see FIG. 1) of the artifact repository 106 (block 210; see FIG. 2).

Figure 3:
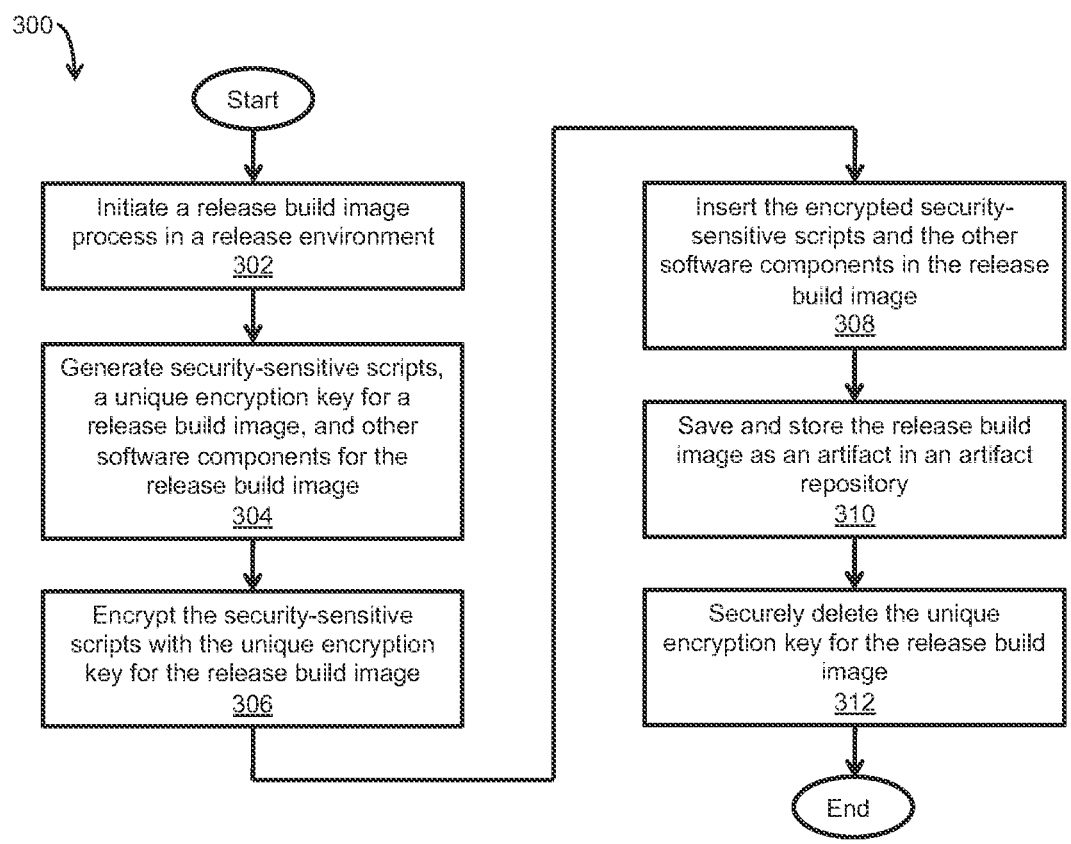
FIG. 3 is a flow diagram for use in further describing the illustrative example of FIG. 2, which includes hiding security-sensitive features in a release build image process.

As shown in FIG. 3, the DevOps engineers further employ the build equipment 104 to initiate the release build image process 300 (block 302; see FIG. 3), which includes executing the build process and deployment code 118 to generate the security-sensitive scripts, to generate a unique encryption key for the release build image, and to generate the other software components or services for the release build image (block 304; see FIG. 3). As described herein, a unique encryption key can be generated for each software build image. The unique encryption key for the release build image is therefore different from the unique encryption key for the development build image. Once the unique encryption key for the release build image has been generated, the build equipment 104 executes the encryption/decryption code 120 to encrypt the security-sensitive scripts with the unique encryption key for the release build image (block 306; see FIG. 3). For example, like the security-sensitive scripts for the development build image, the security-sensitive scripts for the release build image may be encoded in the Base64 format to generate Base64 binary data, which may be encrypted using symmetric encryption. With symmetric encryption, a single key value (e.g., the unique encryption key value for the release build image) can be used both to encrypt the data and to decrypt the data. The build equipment 104 completes the release build image process 300 by inserting the encrypted security-sensitive scripts and the other unencrypted software components or services in the release build image (block 308; see FIG. 3), saving and storing the release build image as an artifact in a volume or folder 140 (see FIG. 1) of the artifact repository 106 (block 310; see FIG. 3), and securely deleting the unique encryption key for the release build image (block 312; see FIG. 3). For example, the unique encryption key for the release build image may be securely deleted by overwriting the unique encryption key with new data, or by using any other suitable technique for securely and permanently deleting data or information.

Figure 4:
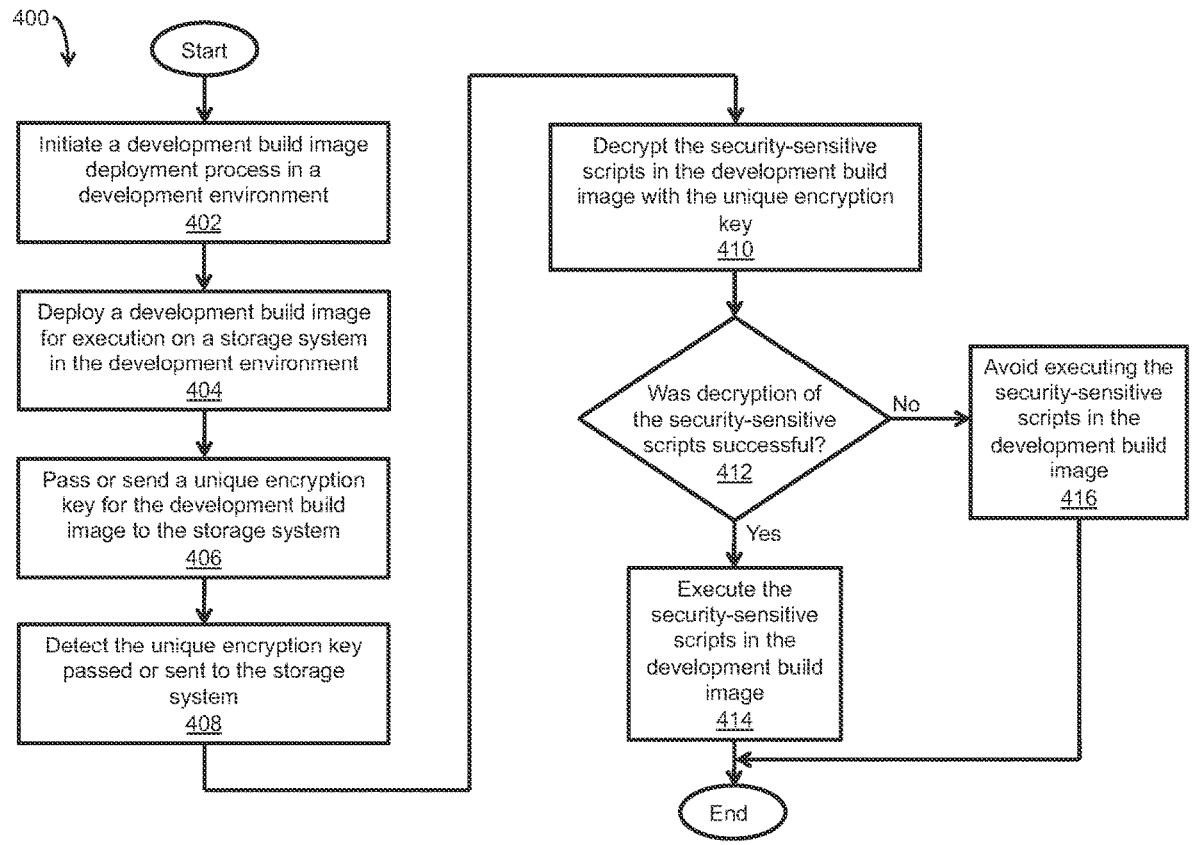
FIG. 4 is a flow diagram for use in further describing the illustrative example of FIG. 2, which includes deploying a development build image for execution on a storage system in a development environment.

As shown in FIG. 4, the DevOps engineers further employ the build equipment 104 to initiate a development build image deployment process 400 (block 402; see FIG. 4), which includes deploying the development build image for execution on the storage system 108 in the development environment (block 404; see FIG. 4). Upon initiation of the development build image deployment process 400, the build equipment 104 passes or sends the unique encryption key for the development build image to the storage system 108 (block 406; see FIG. 4). For example, if the development build image is deployed as an OVF package, then the unique encryption key for the development build image may be passed or sent to the storage system 108 by setting a property in the OVF package, such as:

$$\text{--prop:<key>=<value>,} \tag{1}$$

in which "key" corresponds to the unique encryption key for the development build image and "value" corresponds to the value of the unique encryption key for the development build image.

Upon receipt of the deployment package, the storage system 108 executes the encryption key detection code 132 to detect the unique encryption key for the development build image in the deployment package (block 408; see FIG. 4), and executes the encryption/decryption code 134 to decrypt the encrypted security-sensitive scripts in the development build image with the unique encryption key for the development build image (block 410; see FIG. 4). Having decrypted the security-sensitive scripts, the storage system 108 determines whether or not decryption of the security-sensitive scripts was successful (block 412; see FIG. 4). If the decryption of the security-sensitive scripts was successful, then the storage system 108 executes the security-sensitive scripts in the development build image (block 414; see FIG. 4). If the decryption of the security-sensitive scripts was not successful, then the storage system 108 avoids executing the security-sensitive scripts in the development build image (block 416; see FIG. 4).

Figure 5:
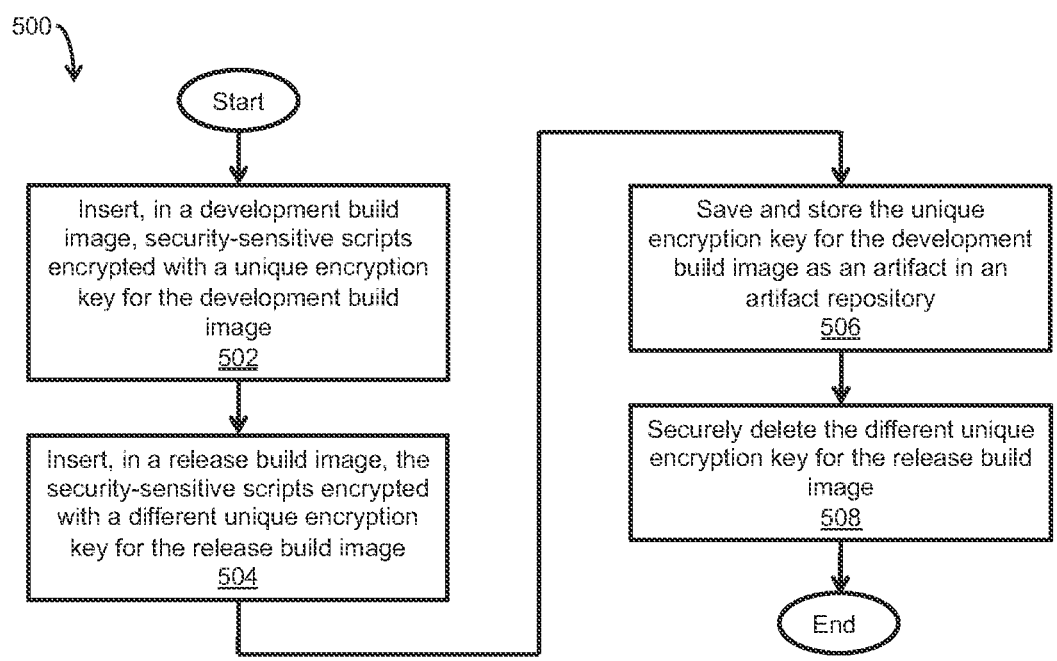
FIG. 5 is a flow diagram of an exemplary method of hiding security-sensitive features in untrusted environments.

An exemplary method of hiding security-sensitive features in untrusted environments is described below with reference to FIG. 5. As depicted in block 502, one or more security-sensitive scripts encrypted with a unique encryption key for a development build image are inserted in the development build image. As depicted in block 504, the security-sensitive scripts encrypted with a different unique encryption key for a release build image are inserted in the release build image. As depicted in block 506, the unique encryption key for the development build image is saved and stored as an artifact in an artifact repository. As depicted in block 508, the different unique encryption key for the release build image is securely deleted. In this way, security can be maintained for security-sensitive code or scripts in a manner that is more user friendly to DevOps engineers.

Having described the above illustrative embodiments, various alternative embodiments and/or variations may be made and/or practiced. For example, it was described herein that once security-sensitive scripts have been encrypted with a unique encryption key for a release build image, the build equipment 104 can securely delete the unique encryption key for the release build image to restrict user access to the security-sensitive scripts. In an alternative embodiment, rather than securely deleting the unique encryption key, the unique encryption key for the release build image can be saved and stored in a secure vault module and accessed, if needed, for subsequent maintenance and/or testing of the release build image.

It was further described herein that the build engine circuitry 112 can execute the encryption/decryption code 120 to encrypt security-sensitive scripts with a unique encryption key for a development build image, and to encrypt the security-sensitive scripts with a different unique encryption key for a release build image. In an alternative embodiment, the security-sensitive scripts for one or both of the development build image and the release build image can be encrypted using an in-memory encryption technique, obviating the need to save and store any unique encryption keys.

It was further described herein that a property in an OVF package can be set to pass or send a unique encryption key for a development build image to the storage system 108. In an alternative embodiment, the unique encryption key for the development build image can be passed or sent to the storage system 108 using Amazon® Web Services (AWS) user data securely readable via Instance Metadata Service version 2 (IMDSv2) or any other suitable technique.

It was further described herein that security-sensitive scripts can be encrypted using a symmetric encryption technique. In an alternative embodiment, the security-sensitive scripts can be encrypted using an asymmetric encryption technique, which can include encrypting the security-sensitive scripts using a public key and passing or sending a private key to the storage system 108 to decrypt the security-sensitive scripts.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   performing a plurality of software build processes including a process of a pre-release version of a software build, and a process of a release version of the software build,
   the process of the pre-release version of the software build comprising:
   generating a pre-release version of a software build image;
   generating a security-sensitive script, a first encryption key, and specified software components;
   encrypting the security-sensitive script with the first encryption key, the specified software components being unencrypted;
   inserting the security-sensitive script encrypted with the first encryption key, and the unencrypted specified software components, into the pre-release version of the software build image; and
   saving and storing the first encryption key to allow decryption of the encrypted security-sensitive script inserted into the pre-release version of the software build image during testing of the pre-release version of the software build image; and
   the process of the release version of the software build comprising:
   generating a release version of the software build image;
   generating a second encryption key, the second encryption key being different from the first encryption key such that each of the pre-release version of the software build image and the release version of the software build image has its own unique encryption key for encrypting the security-sensitive script;
   encrypting the security-sensitive script with the second encryption key;
   inserting the security-sensitive script encrypted with the second encryption key, and the unencrypted specified software components, into the release version of the software build image; and
   securely deleting the second encryption key to prevent decryption of the encrypted security-sensitive script inserted into the release version of the software build image after releasing the release version of the software build image as a final product.

2. The method of claim 1 wherein encrypting the security-sensitive script with the first encryption key includes encrypting the security-sensitive script using one of a first encryption technique and a second encryption technique, the second encryption technique being different from the first encryption technique.

3. The method of claim 2 wherein encrypting the security-sensitive script with the second encryption key includes encrypting the security-sensitive script using the one of the first encryption technique and the second encryption technique.

4. The method of claim 3 further comprising:
   implementing the first encryption technique as a symmetric encryption technique; and
   implementing the second encryption technique as an asymmetric encryption technique.

5. The method of claim 1 further comprising:
   deploying the pre-release version of the software build image to be executed on a storage system in a development and test environment.

6. The method of claim 5 further comprising:
   sending, in a deployment package, the first encryption key for the pre-release version of the software build image to the storage system in the development and test environment,
   wherein the first encryption key is detected by the storage system in the deployment package,
   wherein the security-sensitive script inserted into the pre-release version of the software build image is decrypted by the storage system with the first encryption key, and
   wherein, in response to decryption of the security-sensitive script inserted into the pre-release version of the software build image being successful, the security-sensitive script is executed by the storage system.

7. A system comprising:
   a memory; and
   processing circuitry configured to execute program instructions out of the memory to:
   perform a plurality of software build processes including a process of a pre-release version of a software build, and a process of a release version of the software build,
   the process of the pre-release version of the software build comprising:
   generating a pre-release version of a software build image;
   generating a security-sensitive script, a first encryption key, and specified software components;
   encrypting the security-sensitive script with the first encryption key, the specified software components being unencrypted;
   inserting the security-sensitive script encrypted with the first encryption key, and the unencrypted specified software components, into the pre-release version of the software build image; and
   saving and storing the first encryption key to allow decryption of the encrypted security-sensitive script inserted into the pre-release version of the software build image during testing of the pre-release version of the software build image; and
   the process of the release version of the software build comprising:
   generating a release version of the software build image;
   generating a second encryption key, the second encryption key being different from the first encryption key such that each of the pre-release version of the software build image and the release version of the software build image has its own unique encryption key for encrypting the security-sensitive script;
   encrypting the security-sensitive script with the second encryption key;
   inserting the security-sensitive script encrypted with the second encryption key, and the unencrypted specified software components, into the release version of the software build image; and
   securely deleting the second encryption key to prevent decryption of the encrypted security-sensitive script inserted into the release version of the software build image after releasing the release version of the software build image as a final product.

8. The system of claim 7 wherein the processing circuitry is further configured to execute the program instructions out of the memory to encrypt the security-sensitive script with the first encryption key using one of a first encryption technique and a second encryption technique, the second encryption technique being different from the first encryption technique.

9. The system of claim 8 wherein the processing circuitry is further configured to execute the program instructions out of the memory to encrypt the security-sensitive script with the second encryption key using the one of the first encryption technique and the second encryption technique.

10. The system of claim 9 wherein the first encryption technique is implemented as a symmetric encryption technique, and wherein the second encryption technique is implemented as an asymmetric encryption technique.

11. The system of claim 7 wherein the processing circuitry is further configured to execute the program instructions out of the memory to deploy the pre-release version of the software build image to be executed on a storage system in a development and test environment.

12. The system of claim 11 wherein the processing circuitry is further configured to execute the program instructions out of the memory to send, in a deployment package, the first encryption key for the pre-release version of the software build image to the storage system in the development and test environment, wherein the first encryption key is detected by the storage system in the deployment package, wherein the security-sensitive script inserted into the pre-release version of the software build image is decrypted by the storage system with the first encryption key, and wherein, in response to decryption of the security-sensitive script inserted into the pre-release version of the software build image being successful, the security-sensitive script is executed by the storage system.

13. A computer program product including a set of non-transitory, computer-readable media having instructions that, when executed by processing circuitry, cause the processing circuitry to perform a method comprising:
 performing a plurality of software build processes including a process of a pre-release version of a software build, and a process of a release version of the software build,
 the process of the pre-release version of the software build comprising:
 generating a pre-release version of a software build image;
 generating a security-sensitive script, a first encryption key, and specified software components;
 encrypting the security-sensitive script with the first encryption key, the specified software components being unencrypted;
 inserting the security-sensitive script encrypted with the first encryption key, and the unencrypted specified software components, into the pre-release version of the software build image; and
 saving and storing the first encryption key to allow decryption of the encrypted security-sensitive script inserted into the pre-release version of the software build image during testing of the pre-release version of the software build image; and the process of the release version of the software build comprising:
 generating a release version of the software build image;
 generating a second encryption key, the second encryption key being different from the first encryption key such that each of the pre-release version of the software build image and the release version of the software build image has its own unique encryption key for encrypting the security-sensitive script;
 encrypting the security-sensitive script with the second encryption key;
 inserting the security-sensitive script encrypted with the second encryption key, and the unencrypted specified software components, into the release version of the software build image; and
 securely deleting the second encryption key to prevent decryption of the encrypted security-sensitive script inserted into the release version of the software build image after releasing the release version of the software build image as a final product.

14. The computer program product of claim 13 wherein encrypting the security-sensitive script with the first encryption key includes encrypting the security-sensitive script with the first encryption key using one of a first encryption technique and a second encryption technique, the second encryption technique being different from the first encryption technique.

15. The computer program product of claim 14 wherein encrypting the security-sensitive script with the second encryption key includes encrypting the security-sensitive script with the second encryption key using the one of the first encryption technique and the second encryption technique.

16. The computer program product of claim 15 wherein the method further comprises:
 implementing the first encryption technique as a symmetric encryption technique; and
 implementing the second encryption technique as an asymmetric encryption technique.

17. The computer program product of claim 13 wherein the method further comprises:
 deploying the pre-release version of the software build image to be executed on a storage system in a development and test environment; and
 sending, in a deployment package, the first encryption key for the pre-release version of the software build image to the storage system in the development and test environment,
 wherein the first encryption key is detected by the storage system in the deployment package,
 wherein the security-sensitive script inserted into the pre-release version of the software build image is decrypted by the storage system with the first encryption key, and
 wherein, in response to decryption of the security-sensitive script inserted into the pre-release version of the software build image being successful, the security-sensitive script is executed by the storage system.

\* \* \* \* \*